US012438280B2

(12) United States Patent
Kaneko et al.

(10) Patent No.: US 12,438,280 B2
(45) Date of Patent: Oct. 7, 2025

(54) ANTENNA AND ELECTRONIC DEVICE

(71) Applicant: SONY GROUP CORPORATION, Tokyo (JP)

(72) Inventors: Yukio Kaneko, Tokyo (JP); Takashi Kawamura, Tokyo (JP); Tetsuo Ikeda, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 219 days.

(21) Appl. No.: 18/042,496

(22) PCT Filed: Aug. 17, 2021

(86) PCT No.: PCT/JP2021/030008

§ 371 (c)(1),
(2) Date: Feb. 22, 2023

(87) PCT Pub. No.: WO2022/050039

PCT Pub. Date: Mar. 10, 2022

(65) Prior Publication Data

US 2023/0327342 A1 Oct. 12, 2023

(30) Foreign Application Priority Data

Sep. 2, 2020 (JP) ................................ 2020-147314

(51) Int. Cl.
*H01Q 11/08* (2006.01)
*H01Q 1/24* (2006.01)
(Continued)

(52) U.S. Cl.
CPC ............... *H01Q 11/08* (2013.01); *H01Q 1/24* (2013.01); *H01Q 1/273* (2013.01); *H01Q 1/362* (2013.01);
(Continued)

(58) Field of Classification Search
CPC . H01Q 11/08; H01Q 9/16; H01Q 1/24; H01Q 21/28; H01Q 1/273; H01Q 21/06; H01Q 1/362; H01Q 19/104
See application file for complete search history.

(56) References Cited

U.S. PATENT DOCUMENTS 5,612,704 A * 3/1997 Cole ...................... H01Q 1/244 343/900
5,903,242 A * 5/1999 Tsuru ...................... H01Q 1/38 343/788
(Continued)

FOREIGN PATENT DOCUMENTS

JP 61-200704 A 9/1986
JP 05-002426 U1 1/1993
(Continued)

OTHER PUBLICATIONS

International Search Report and Written Opinion of PCT Application No. PCT/JP2021/030008, issued on Nov. 9, 2021, 09 pages of ISRWO.

*Primary Examiner* — Hai V Tran
(74) *Attorney, Agent, or Firm* — CHIP LAW GROUP

(57) ABSTRACT

A small-sized normal mode helical antenna is provided that is not affected by nearby conductors. The antenna is an antenna including a coil constituting a normal mode helical antenna, an area of a cross section perpendicular to an axis of the coil for a single turn at each end of the coil being less than an area of a cross section perpendicular to the axis of the coil near the coil center.

13 Claims, 20 Drawing Sheets

(51) Int. Cl.
*H01Q 1/27* (2006.01)
*H01Q 1/36* (2006.01)
*H01Q 9/16* (2006.01)
*H01Q 21/06* (2006.01)
*H01Q 21/28* (2006.01)

(52) U.S. Cl.
CPC ............... *H01Q 9/16* (2013.01); *H01Q 21/06* (2013.01); *H01Q 21/28* (2013.01)

(56) References Cited

U.S. PATENT DOCUMENTS 6,172,655 B1 * 1/2001 Volman ................ H01Q 21/067 343/895
7,586,463 B1 * 9/2009 Katz ...................... H01Q 21/28 343/718

FOREIGN PATENT DOCUMENTS

| | | | |
|---|---|---|---|
| JP | 2003-324795 | A | 11/2003 |
| JP | 2005-354297 | A | 12/2005 |
| WO | 98/015028 | A1 | 4/1998 |
| WO | 2012/016144 | A2 | 2/2012 |

* cited by examiner

ANTENNA AND ELECTRONIC DEVICE

CROSS REFERENCE TO RELATED APPLICATIONS

This application is a U.S. National Phase of International Patent Application No. PCT/JP2021/030008 filed on Aug. 17, 2021, which claims priority benefit of Japanese Patent Application No. JP 2020-147314 filed in the Japan Patent Office on Sep. 2, 2020. Each of the above-referenced applications is hereby incorporated herein by reference in its entirety.

TECHNICAL FIELD

The present technology relates to an antenna and an electronic device.

BACKGROUND ART

Conventionally, a helical antenna having a configuration in which a conductive wire is wound spirally has been known. The helical antenna has a structure capable of downsizing an antenna. Furthermore, in a case where a peripheral length of a single winding of the helical antenna is sufficiently smaller than a wavelength, radiation occurs in a direction perpendicular to an axis of the helical antenna. The helical antenna having such characteristics is referred to as a normal mode helical antenna. The normal mode helical antenna is a small and highly efficient antenna.

Patent Document 1 describes a technique in which a coil cross-sectional area S, a pitch p, and a total length of the normal mode helical antenna are all 1/10 or less of a wavelength λ, and the coil cross-sectional area S and the pitch p satisfy a relationship of ($2\pi S \approx p\lambda$) with respect to the wavelength λ, so that the normal mode helical antenna can be used even in an environment near a dielectric/metal part or a human body.

Patent Document 2 describes a configuration of a monopole type helical antenna having an element with a wire, the one end of which is grounded and another end of which is opened, being spirally wounded around the element, in which a winding diameter of the wire increases from a ground side toward an open side.

CITATION LIST

Patent Document

Patent Document 1: JP 2005-354297 A
Patent Document 2: JP 2003-324795 A

SUMMARY OF THE INVENTION

Problems to be Solved by the Invention

As one of the problems, since the normal mode helical antenna described in Patent Document 1 has radiation due to the same principle as that in a dipole antenna and an inverted-F antenna, radiation power decreases when a metal or a human body is nearby, and sufficient efficiency cannot be secured in a case where the normal mode helical antenna is incorporated into an electronic device. Furthermore, another problem is that due to its cylindrical coil shape, the normal mode helical antenna occupies a large area in the electronic device. The helical antenna described in Patent Document 2 improves radiation characteristics, and the improvement is different from reduction of influence by the metal and the human body and downsizing that are one of the objects of the present technology.

An object of the present technology is to provide an antenna and an electronic device capable of reducing influence of a metal and a human body and downsizing.

Solution to Problems

The present technology is, for example, an antenna including a coil constituting a normal mode helical antenna, an area of a cross section perpendicular to an axis of the coil for a single turn at each end of the coil being less than an area of a cross section perpendicular to the axis of the coil near a center of the coil.

Furthermore, the present technology is an electronic device on which such an antenna is mounted.

MODE FOR CARRYING OUT THE INVENTION

Figure 1:
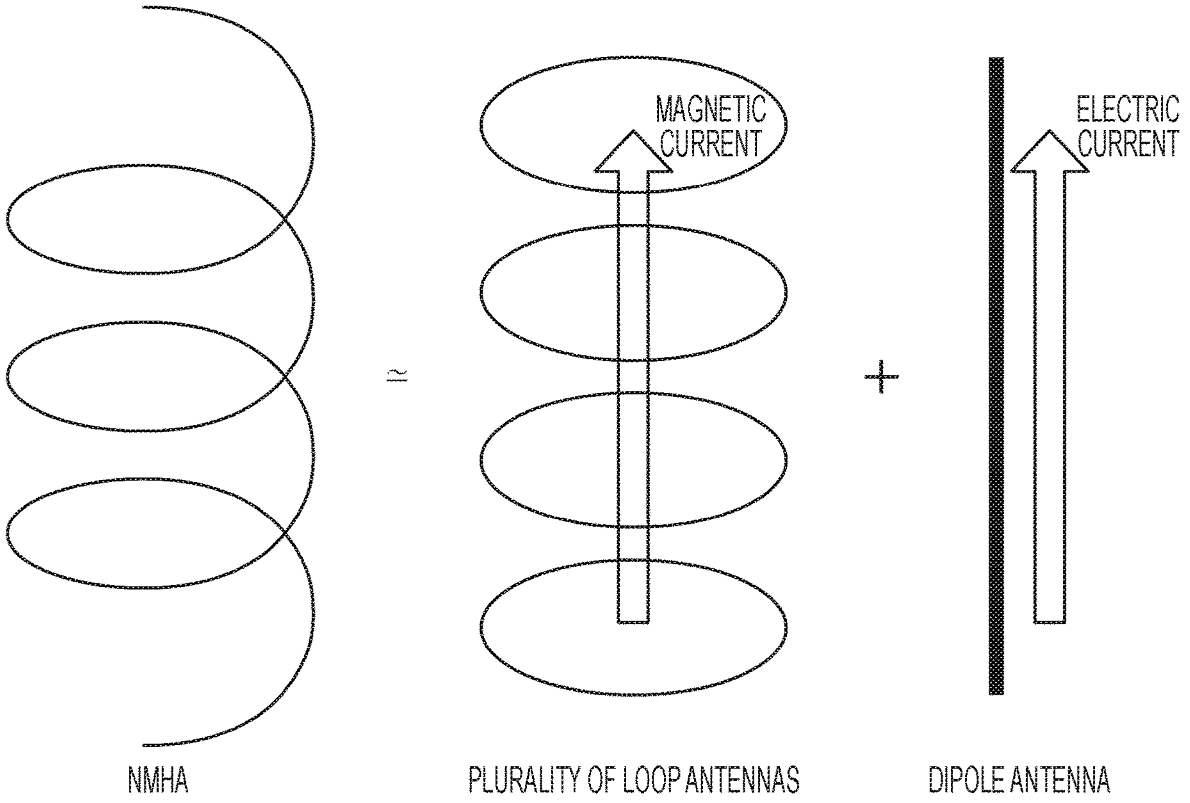
FIG. 1 is a diagram for explaining a normal mode helical antenna.

The embodiments described below are preferable specific examples of the present technology, and various technically suitable limitations are given to the embodiments. However, the scope of the present technology is not limited to these embodiments unless there is a description to particularly limit the present technology in the following description. Furthermore, in the following description, the same names and reference numerals indicate the same or equivalent constituent elements, and redundant description will be omitted as appropriate.

As illustrated in FIG. 1, a normal mode helical antenna (NMHA) can be considered to be substantially equivalent to a configuration in which a plurality of loop antennas and a dipole antenna that extends in an axial direction of the normal mode helical antenna are combined. A magnetic current flows in the axial direction of the plurality of loop antennas, and an electric current flows through the dipole antenna. When a diameter of the loop antenna is large, inductance thereof is large, so that radiation originating from the magnetic current is increased.

Figure 2:
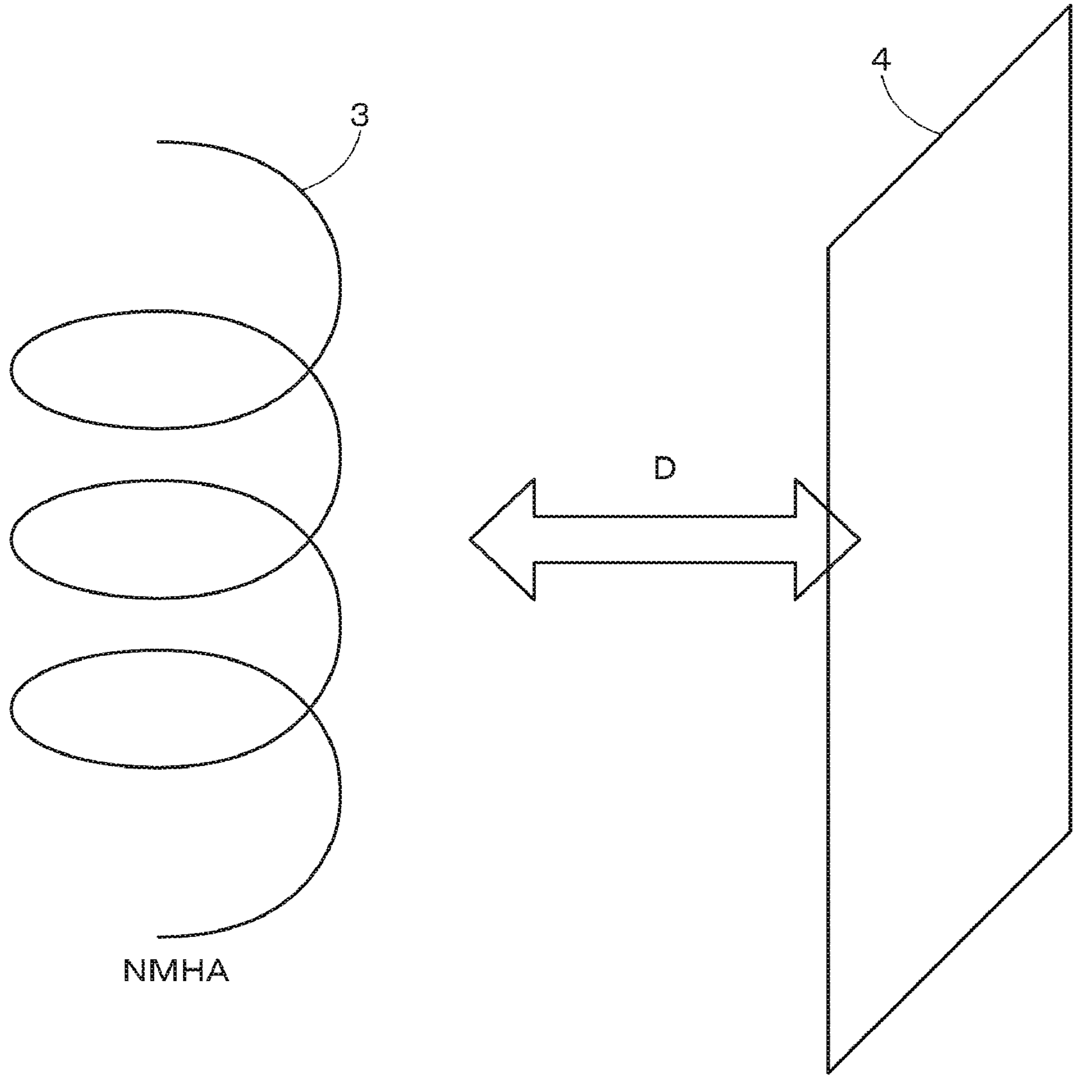
FIG. 2 is a diagram for explaining characteristics of the normal mode helical antenna.
Figure 3:
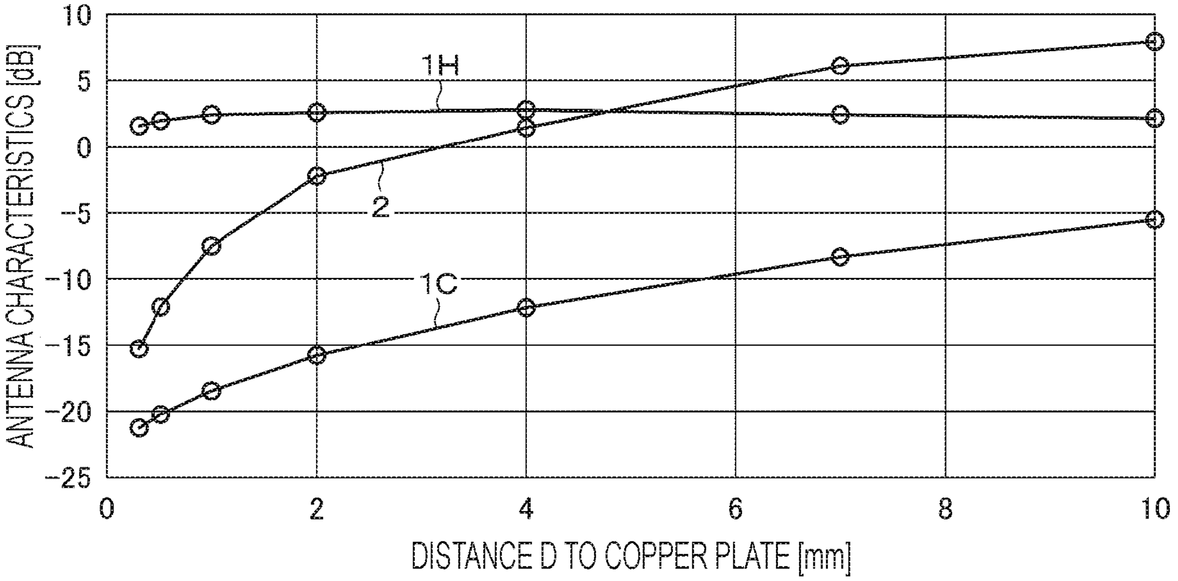
FIG. 3 is a diagram for explaining the normal mode helical antenna.

As illustrated in FIG. 2, when a copper plate 4 is placed at a position separated in a direction perpendicular to the axial direction of a coil 3 of the normal mode helical antenna, relationship between a separation distance D (mm) and radiation power of the antenna is as illustrated in a graph of FIG. 3. In FIG. 3, a characteristic curve 1H indicates a change in the radiation power of a component of the magnetic current of the loop antenna of the normal mode helical antenna, and a characteristic curve 1C indicates a change in the radiation power of a component of the electric current of the dipole antenna of the normal mode helical antenna. Moreover, a characteristic curve 2 of the change in radiation power of an existing dipole antenna is shown for reference.

When the separation distance D from the copper plate 4 decreases, the decrease in the radiation power of the component of the electric current is larger than the decrease in the radiation power of the component of the magnetic current. The same influence is generated by a human body, which is a conductor similarly to the copper plate 4. In order to prevent degradation of the performance of the antenna due to a conductor, it is effective to increase the component of the magnetic current.

Figure 4A:
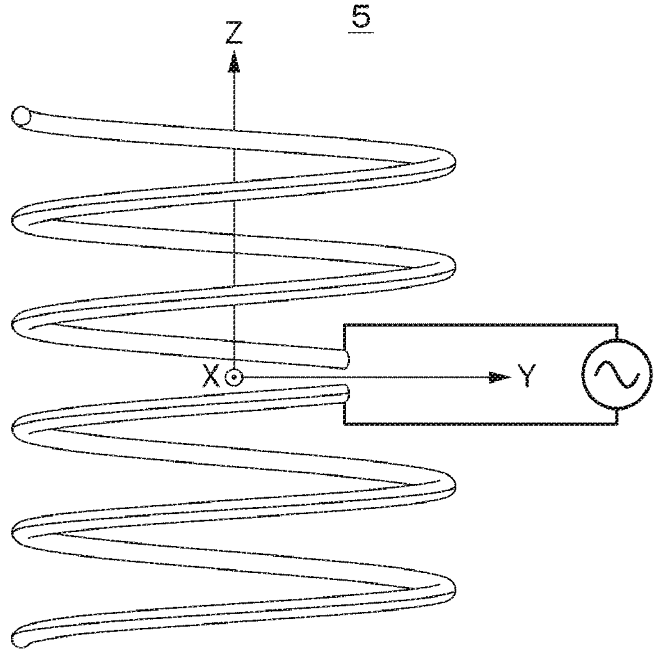
FIGS. 4A and 4B are diagrams illustrating a conventional normal mode helical antenna and a normal mode helical antenna according to the present technology.

As illustrated in FIG. 4A, in a normal mode helical antenna 5 having a coil shape in which a cross-sectional area perpendicular (orthogonal) to the axial direction of the coil is constant, contribution to the magnetic current from near the coil center where the electric current intensity increases is large, and by contrast, contribution to the magnetic flow from near a coil end where the electric current intensity decreases is small. For example, a substantially central position of the coil is regarded as a feeding point. Therefore, by increasing a coil diameter near the coil center, the magnetic current intensity is increased, and it makes it possible to use in an environment near a metal part in an electronic device or a human body. Furthermore, since the contribution from near the coil end to the magnetic current is small, by reducing the coil diameter near the coil end, an occupied area in the electronic device can be reduced.

Figure 4B:
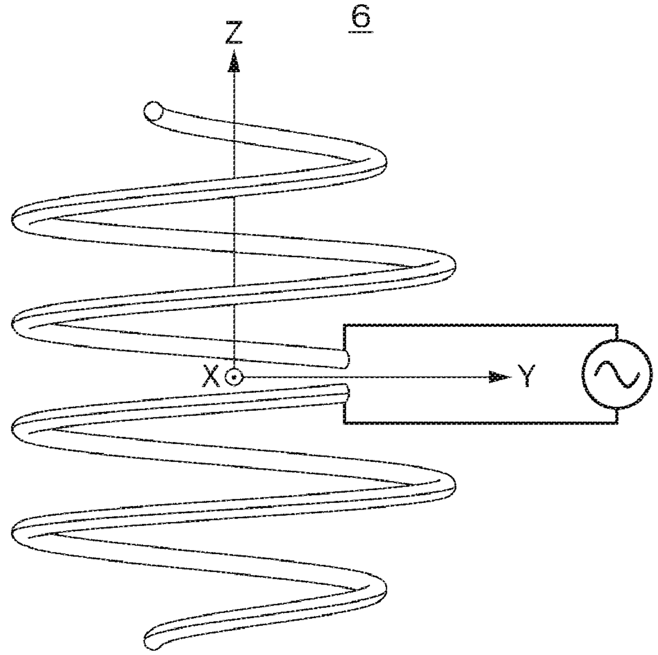

As illustrated in FIG. 4B, the present technology is a normal mode helical antenna 6 configured such that a cross-sectional area perpendicular to the axial direction of the coil near the coil center is larger than a cross-sectional area at each end thereof. The feeding point is provided near the coil center, and two coils are controlled with respect to the feeding point. In an example of FIG. 4B, the cross-sectional area at each end of the coil is smaller than the other cross-sectional areas of the coil. Table 1 shows a comparison result between the normal mode helical antenna 5 (conventional technology illustrated in FIG. 4A) having the same number of turns and the normal mode helical antenna 6 of the present technology.

As illustrated in FIGS. 4A and 4B, the coil cross-sectional areas near the centers of both are made equal, and in the conventional technology, the coil cross-sectional area is constant between both ends, whereas in a case of the present technology, the coil cross-sectional area is decreased toward both ends. The numbers of turns of both are equal. Note that a plane formed in a direction perpendicular to the axis of the coil of the normal mode helical antenna 6 in the present technology is defined as an (x-y) plane, and the direction of the central axis of the coil is defined as z. The cross-sectional area of the coil is an area in a case where a single turn of the coil is projected on the (x-y) plane. Furthermore, a volume of the coil is a value obtained by multiplying the cross-sectional area of the coil by the length in the z direction.

TABLE 1

| | Conventional technology | Present technology |
|---|---|---|
| Gain (magnetic current) | −7.26 | −6.56 |
| Gain (electric current) | −1.59 | −1.98 |
| Area ($mm^2$) | 24 | 23.4 |
| Volume ($mm^3$) | 75.4 | 72.9 |
| Resonance frequency (GHz) | 2.37 | 2.38 |
| Radiation efficiency | −2.58 | −2.45 |

In Table 1, the area is an area occupied by an outer shape of the normal mode helical antenna projected on a two-dimensional plane (for example, the (x-y) plane). In a case of the conventional technology, the outer shape is a rectangle, and in a case of the present technology, both ends of the rectangle have a tapered outer shape. The volume is a volume of a three-dimensional body formed by connecting outer sides of a plurality of coils. As can be seen from Table 1, the present technology can decrease the area and the volume as compared to the conventional technology, and a gain of an electric current component decreases, but a gain of a magnetic current component increases. Therefore, the present technology can increase the radiation originating from the magnetic current as compared to the conventional technology, and can prevent the degradation of the performance of the antenna in the environment near the metal part in the electronic device or the human body.

Hereinafter, a plurality of embodiments and application examples of the present technology will be described in order. Note that in the drawings of the embodiments described below, the feeding points are omitted. A position of the feeding point illustrated in FIG. 4B is an example, and a position shifted to one side may be used as the feeding point.

First Embodiment

Figure 5:
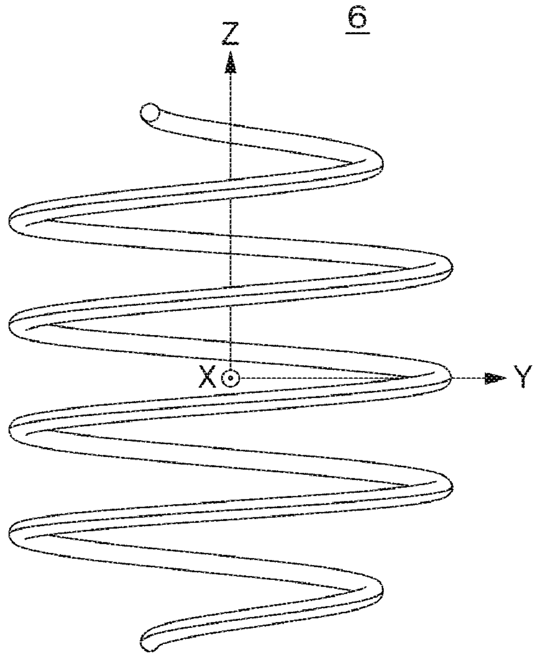
FIG. 5 is a diagram illustrating a first embodiment of the present technology.

An area of a cross section perpendicular to an axis of a coil for a single turn at each end of the coil constituting a normal mode helical antenna described in the following plurality of embodiments is less than an area of a cross section perpendicular to the axis of the coil near the coil center. FIG. 5 is a diagram illustrating a normal mode helical antenna 6 according to the first embodiment of the present technology. The normal mode helical antenna 6 is a coil-shaped antenna including a good conductor, and a diameter (cross-sectional area) of the coil for a single turn from an open end of the coil is smaller than a diameter (cross-sectional area) of the coil center. The first embodiment has a configuration similar to a configuration illustrated in FIG. 4B described above.

Second Embodiment

Figure 6:
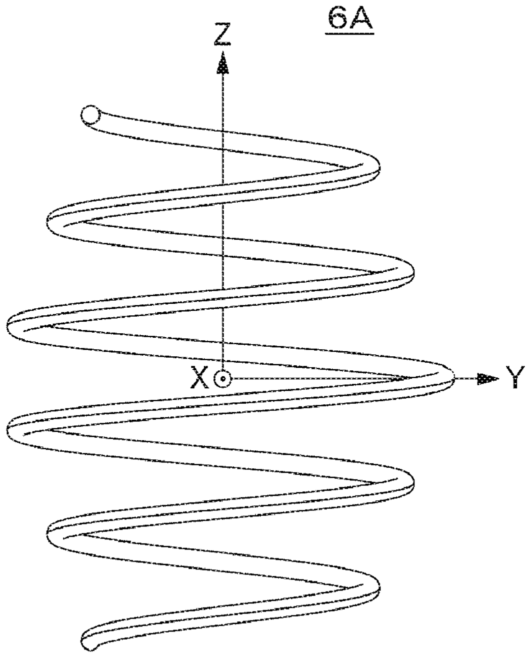
FIG. 6 is a diagram illustrating a second embodiment of the present technology.

FIG. 6 is a diagram illustrating a normal mode helical antenna 6A according to the second embodiment of the present technology. The normal mode helical antenna 6A is a coil-shaped antenna including a good conductor and has a configuration in which a diameter of the coil monotonously decreases from the center toward both open ends.

Third Embodiment

Figure 7:
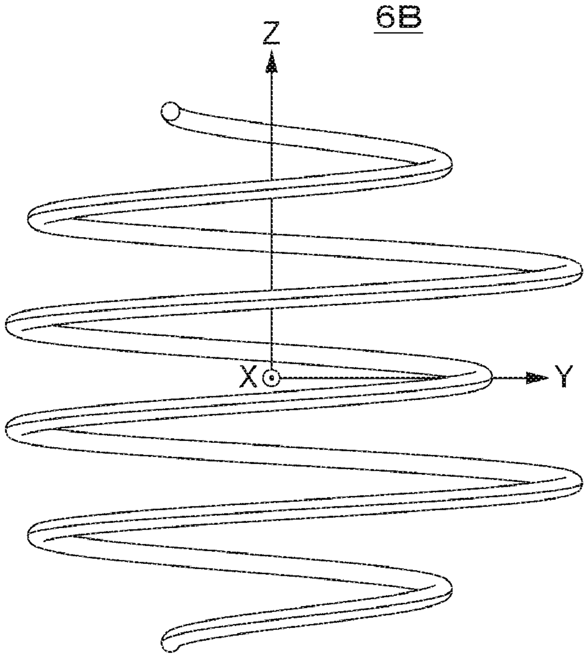
FIG. 7 is a diagram illustrating a third embodiment of the present technology.

FIG. 7 is a diagram illustrating a normal mode helical antenna 6B according to the third embodiment of the present technology. The normal mode helical antenna 6B is a coil-shaped antenna including a good conductor, and a diameter (coil cross-sectional area) of the coil for a single turn from an open end of the coil is smaller than a diameter (coil cross-sectional area) of the coil center. As in this third embodiment, the diameter of the coil may partially increase from the center to the open end.

Fourth Embodiment

Figure 8:
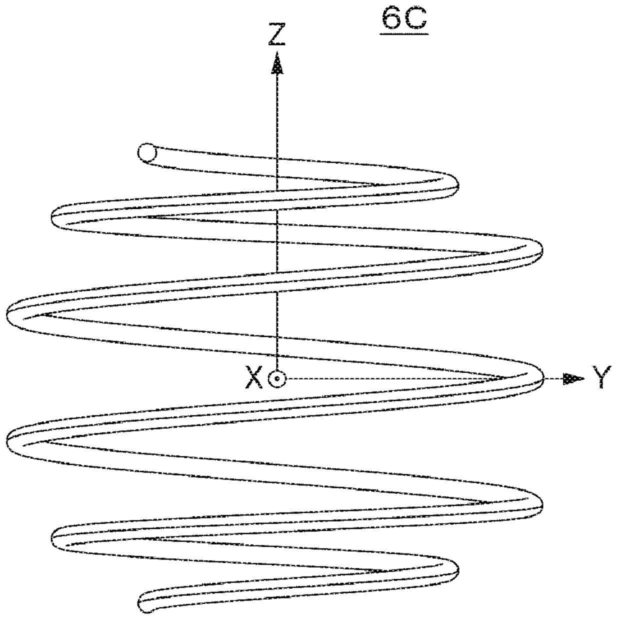
FIG. 8 is a diagram illustrating a fourth embodiment of the present technology.

FIG. 8 is a diagram illustrating a normal mode helical antenna 6C according to the fourth embodiment of the present technology. The normal mode helical antenna 6C is a coil-shaped antenna including a good conductor, a diameter near an open end is smaller than a diameter near the coil center, and a pitch of the coil is not constant. The resonance frequency and the impedance of the antenna can be adjusted by adjusting the pitch of the coil. Note that a pitch interval may be changed at any desired portion of the coil.

Fifth Embodiment

Figure 9A:
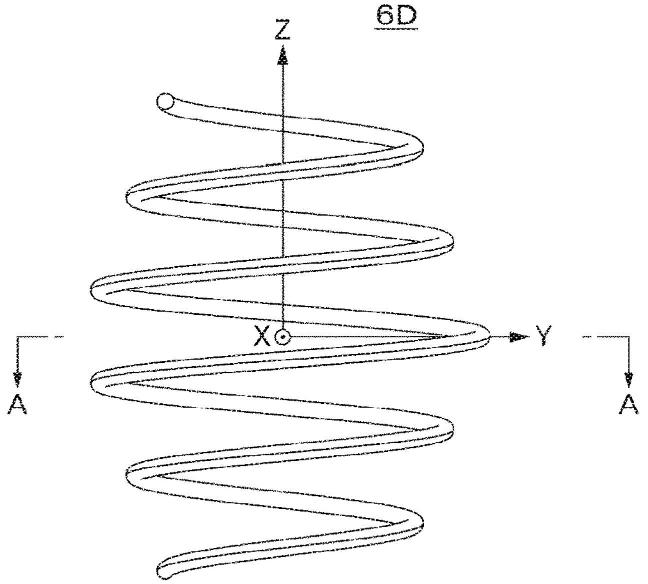
FIGS. 9A, 9B, 9C, 9D, and 9E are diagrams illustrating a fifth embodiment of the present technology.
Figure 9B:
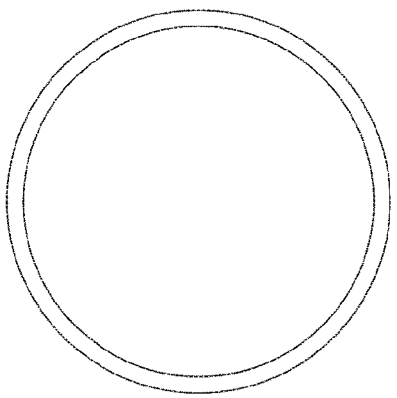
Figure 9D:
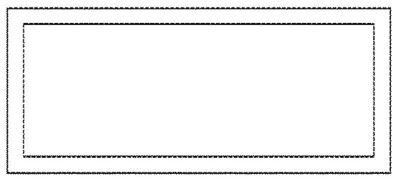
Figure 9C:
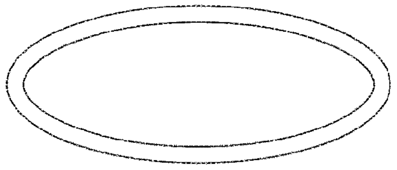
Figure 9E:
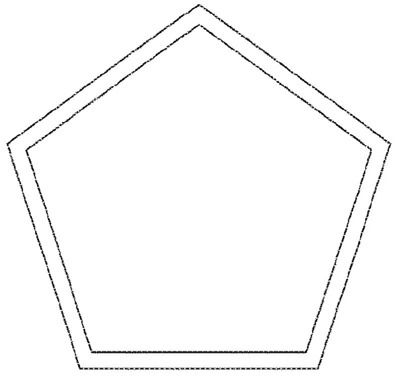

FIGS. 9A and 9E are diagrams illustrating a normal mode helical antenna 6D according to the fifth embodiment of the present technology. The cross-sectional shape (shape projected on the x-y plane) of the coil of the normal mode helical antenna 6D is any shape of an ellipse (FIG. 9C), a rectangle (FIG. 9D), and a polygon (FIG. 9E) in addition to a perfect circle (FIG. 9B). Note that, for a polygon, the number of vertices of the polygon may be changed. Furthermore, a magnetic current type radiation is obtained with respect to a shape without a recess. It is more preferable to have a convex cross-sectional shape without a recess than a shape with a recess such as a star shape.

Sixth Embodiment

Figure 10:
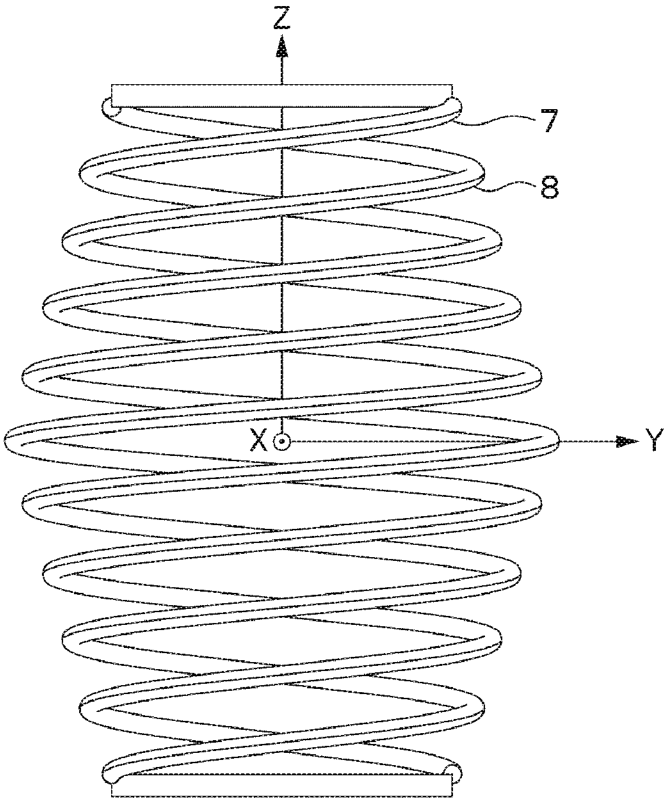
FIG. 10 is a diagram illustrating a sixth embodiment of the present technology.

FIG. 10 is a diagram illustrating a normal mode helical antenna according to the sixth embodiment of the present technology. This normal mode helical antenna includes two coils (antenna elements) 7 and 8 each including a good conductor and having a diameter decreasing from near the center to the end, and is configured such that both ends of the coils 7 and 8 are short-circuited and central axes of the coils coincide with each other. A feeding point is provided on one of the two coils 7 and 8. The normal mode helical antenna is generally known to have a small radiation resistance, and impedance matching is required. With the configuration illustrated in FIG. 10, impedance matching can be achieved.

Seventh Embodiment

Figure 11:
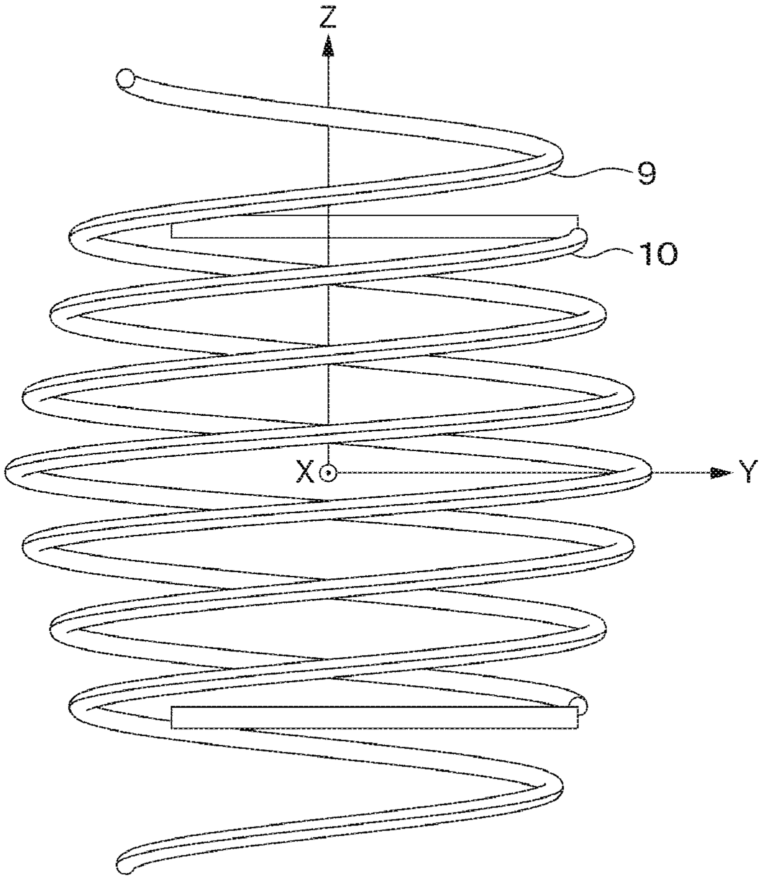
FIG. 11 is a diagram illustrating a seventh embodiment of the present technology.

FIG. 11 is a diagram illustrating a normal mode helical antenna according to the seventh embodiment of the present technology. This normal mode helical antenna includes two coils (antenna elements) 9 and 10 each including a good conductor, having a diameter decreasing from near the center to the end, and having a different length, and is configured such that both ends of the coil 10 are short-circuited by being connected to predetermined portions of the coil 9 and central axes of the coils 9 and 10 coincide with each other. A feeding point is provided on one of the two coils 9 and 10. With the configuration illustrated in FIG. 11, impedance matching can be achieved.

Eighth Embodiment

Figure 12:
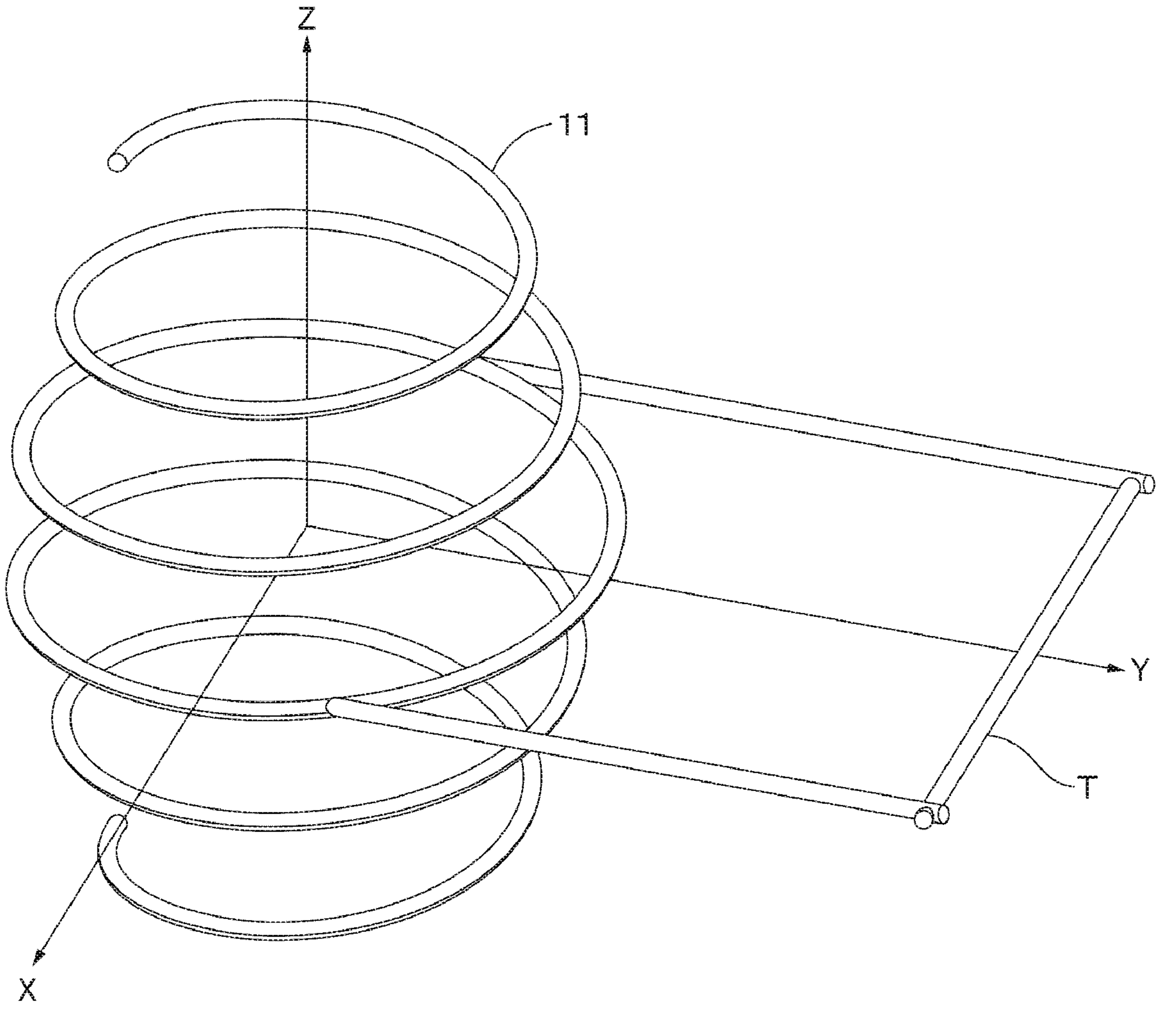
FIG. 12 is a diagram illustrating an eighth embodiment of the present technology.

FIG. 12 is a diagram illustrating a normal mode helical antenna according to the eighth embodiment of the present technology. The normal mode helical antenna according to the present embodiment includes an impedance matching mechanism provided with a coil (antenna element) 11 including a good conductor and having a diameter decreases from near the center to the end and a tap T having a feeding unit, the impedance matching mechanism being configured by short-circuiting both ends of the tap T to the antenna element. With the configuration illustrated in FIG. 12, impedance matching can be achieved. Note that the shape of the tap T may be changed.

Ninth Embodiment

Figure 13:
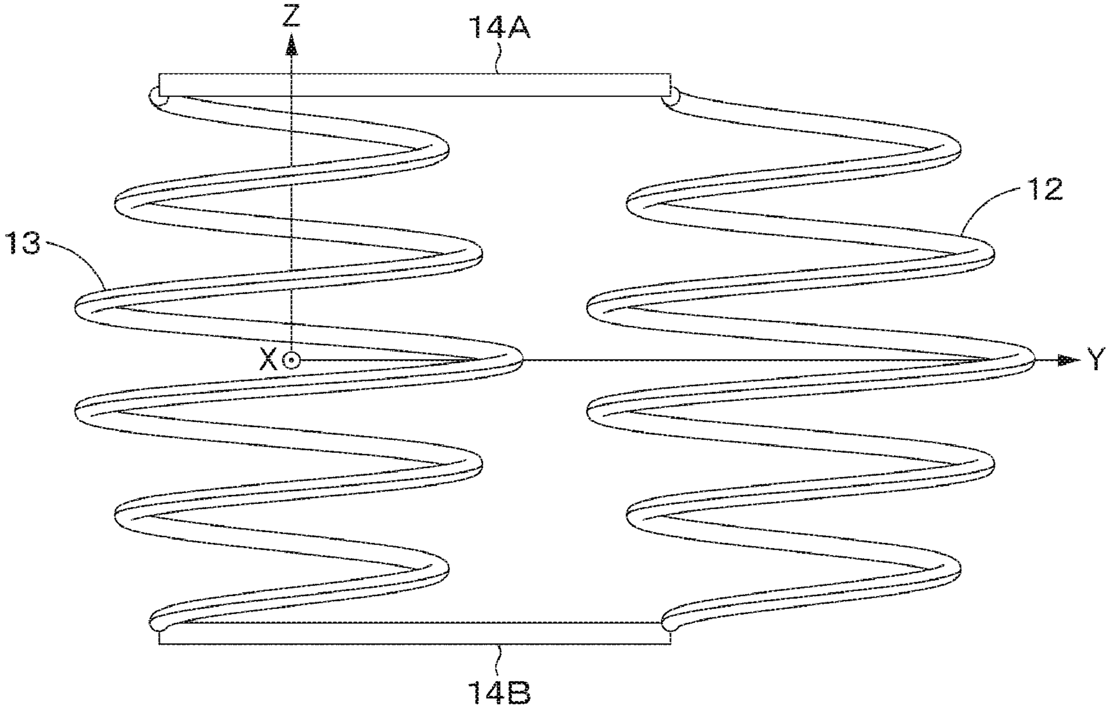
FIG. 13 is a diagram illustrating a ninth embodiment of the present technology.

FIG. 13 is a diagram illustrating a normal mode helical antenna according to the ninth embodiment of the present technology. This normal mode helical antenna includes coils (antenna elements) 12 and 13 each including a good conductor, having a diameter decreases from near the coil center to the end, and arranged in plane symmetry, and is configured such that one of the coils has a feeding point and both ends of the antenna elements 12 and 13 are short-circuited by the good conductors 14A and 14B. With the configuration illustrated in FIG. 13, impedance matching can be achieved. Note that the number of antenna elements may be three or more, and all the ends may be short-circuited.

Tenth Embodiment

Figure 14:
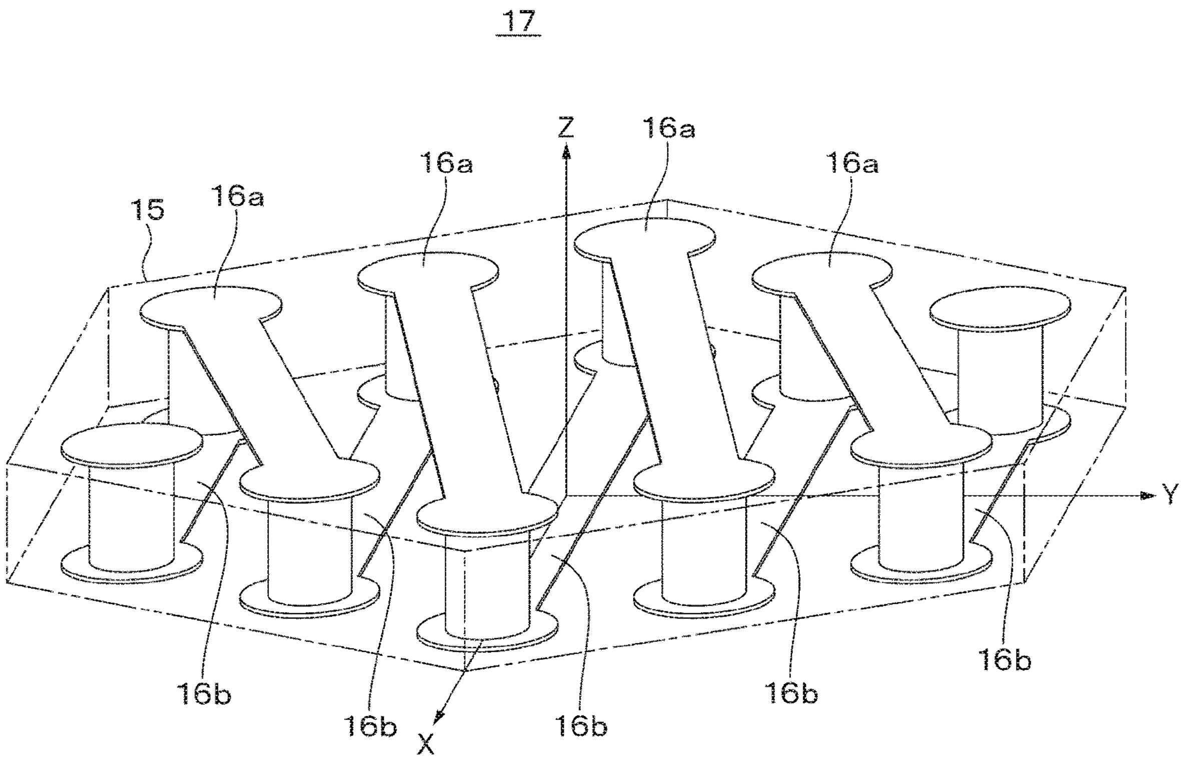
FIG. 14 is a diagram illustrating a tenth embodiment of the present technology.

FIG. 14 is a diagram illustrating a normal mode helical antenna 17 according to the tenth embodiment of the present technology. The antenna 17 includes patterns 16*a* and 16*b* on the surfaces (both surfaces) of a substrate (dielectric material or magnetic material) 15 indicated by a two-dot chain line and a through hole penetrating the substrate 15, and the patterns 16*a* and 16*b* are connected via the through hole, so that the antenna 17 having a diameter of the coil decreasing from near the center to the end is formed. Note that, an antenna element may be formed by a pattern on a surface of a dielectric material using, as a three-dimensional wiring method, laser direct structuring (LDS). LDS is a wiring technique, in which, on a special resin material to which a metal catalyst is added, a place where wiring is to be formed is irradiated with laser and is thereby activated, and thereafter, a plating step is performed to form 3D wiring. Using LDS can form an antenna element so as to be wound around a dielectric material.

Eleventh Embodiment

Figure 15:
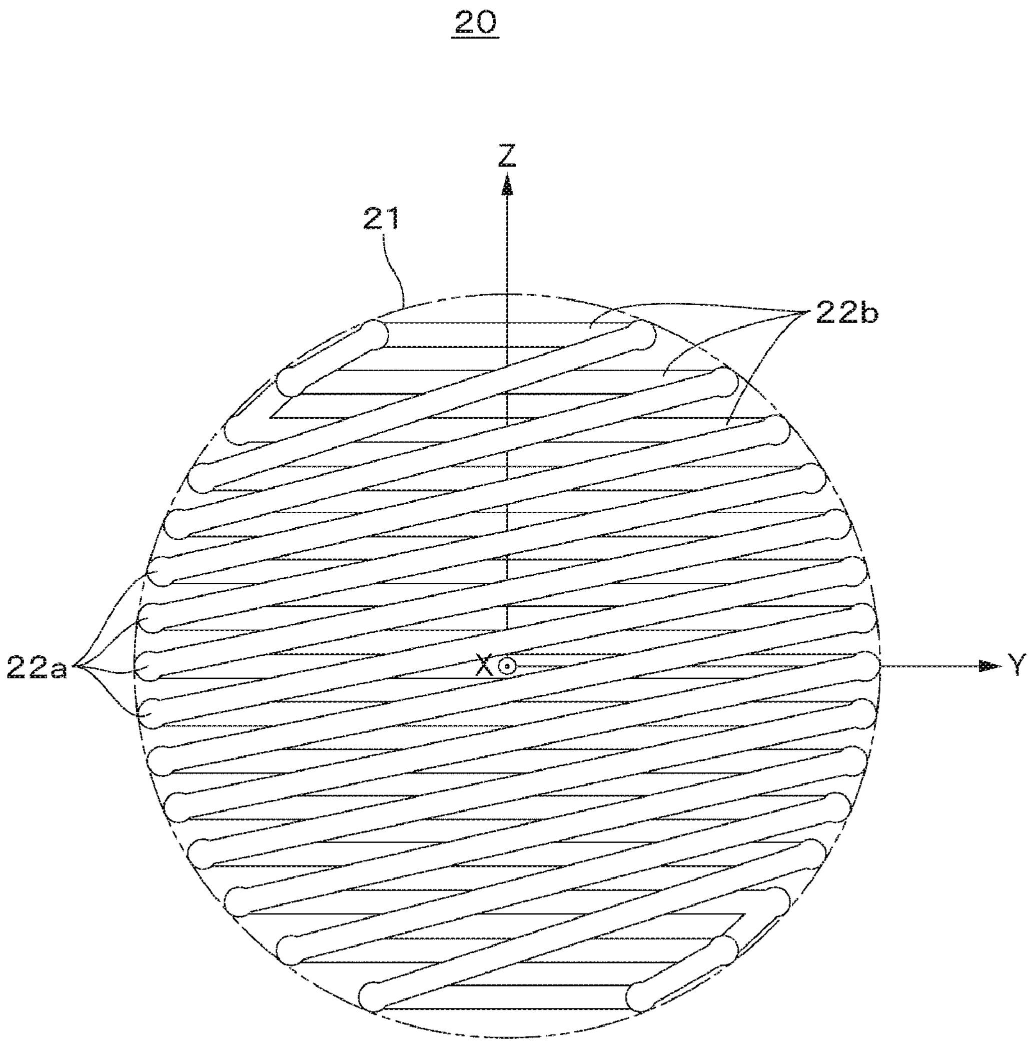
FIG. 15 is a diagram illustrating an eleventh embodiment of the present technology.

FIG. 15 is a diagram illustrating a normal mode helical antenna 20 according to the eleventh embodiment of the present technology. The antenna 20 includes patterns 22*a* and 22*b* on both surfaces of a substrate 21 indicated by a two-dot chain line and through holes penetrating the substrate, and the patterns 22*a* and 22*b* are connected via the through holes, so that the antenna 20 having a diameter of the coil decreasing from near the center to the end is formed. The three antennas 20 may be provided, both ends of the antennas 20 may be short-circuited with their central axes substantially coinciding with each other, and impedance may be adjusted to match 50Ω. The above-described LDS may be used as a three-dimensional wiring method.

Twelfth Embodiment

Figure 16:
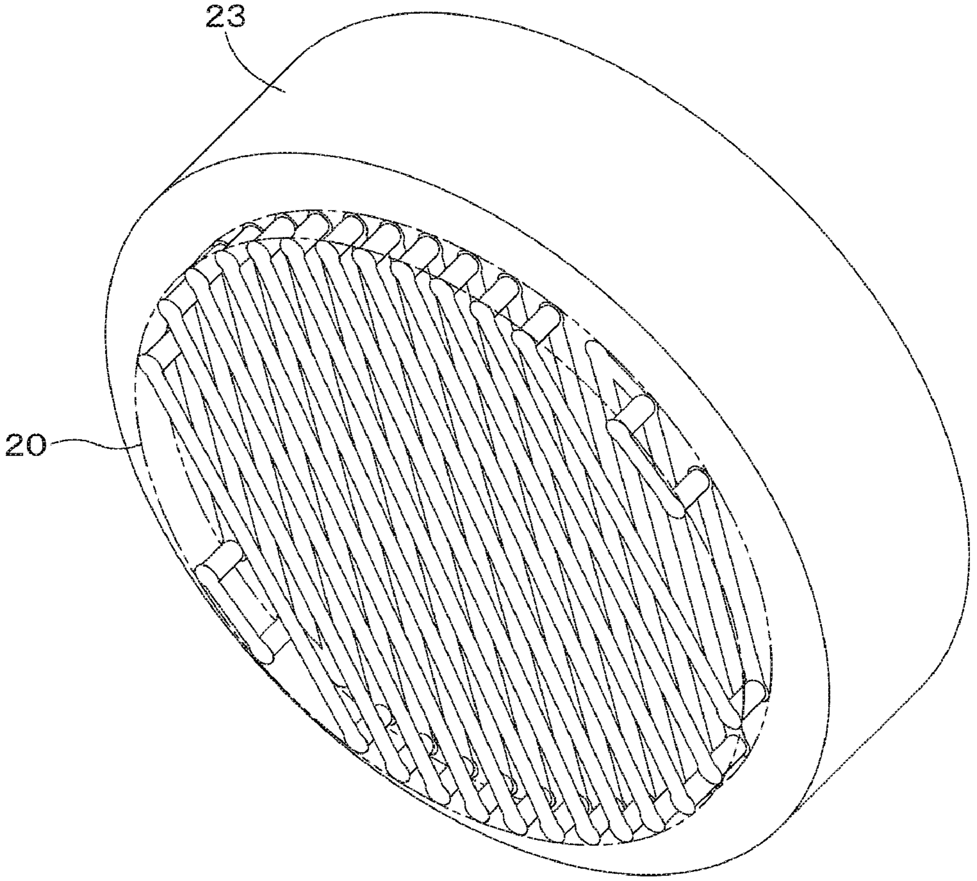
FIG. 16 is a diagram illustrating a twelfth embodiment of the present technology.

FIG. 16 is a diagram illustrating a normal mode helical antenna according to the twelfth embodiment of the present technology. This normal mode helical antenna is an antenna including the antenna 20 that is the normal mode helical antenna of the above-described eleventh embodiment and a good conductor, for example, a metal plate 23, being substantially parallel to the axis (z direction) of the coil of the antenna 20. By including the metal plate 23, the radiation of the magnetic current is further improved. Note that the three antennas 20 may be provided, both ends of the antennas 20 may be short-circuited with their central axes substantially coinciding with each other, and impedance may be adjusted to match 50Ω.

Thirteenth Embodiment

Figure 17:
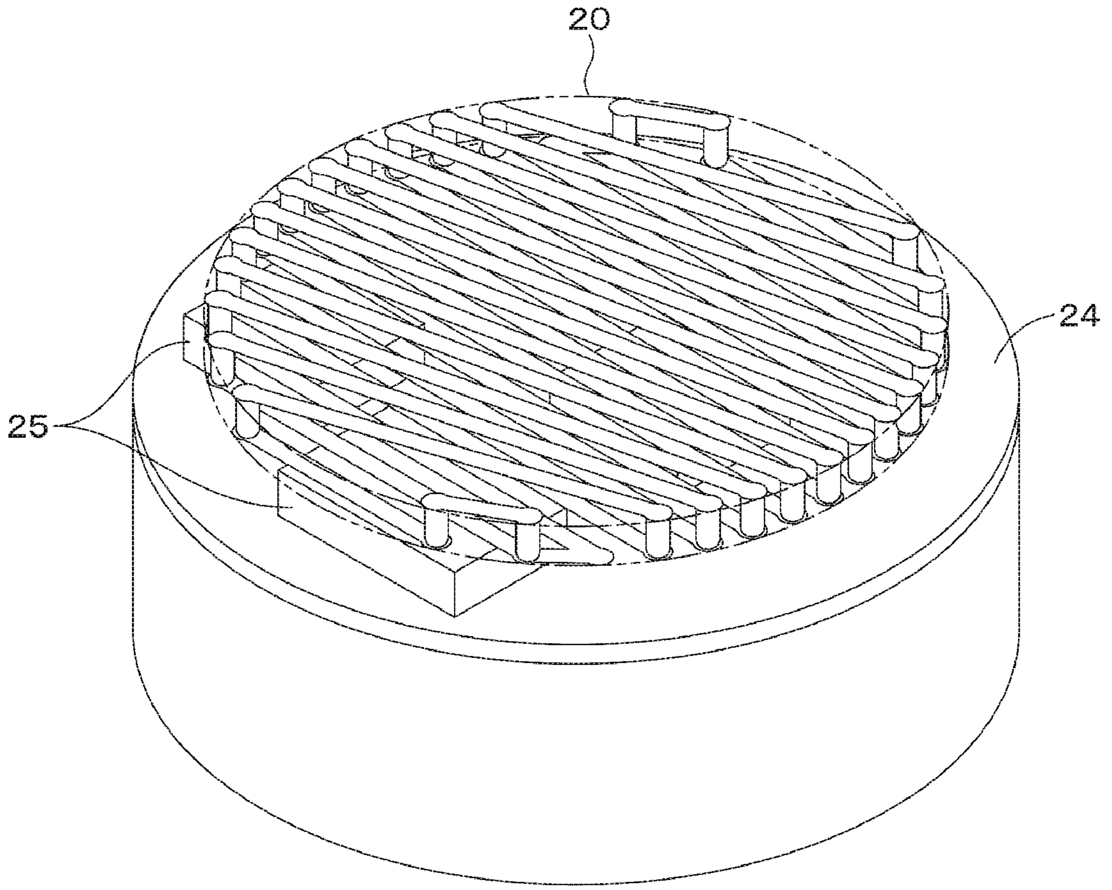
FIG. 17 is a diagram illustrating a thirteenth embodiment of the present technology.
Figure 18:
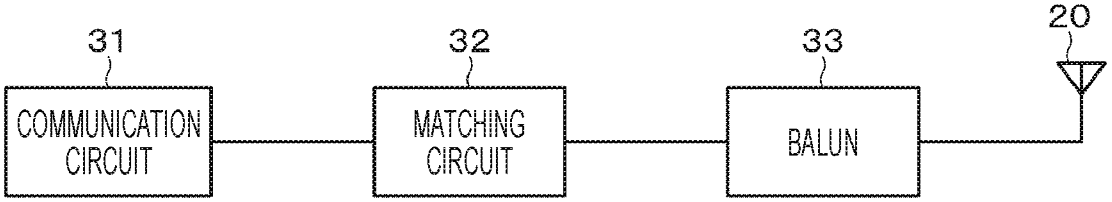
FIG. 18 is a block diagram illustrating a circuit configuration of the thirteenth embodiment.

FIG. 17 is a diagram illustrating an antenna device including a normal mode helical antenna according to the thirteenth embodiment of the present technology. The antenna device including the normal mode helical antenna 20 according to the twelfth embodiment, a substrate 24, and a component 25, such as a balun, a matching circuit, and a communication circuit, mounted on the substrate 24 is configured. As illustrated in FIG. 18, a matching circuit 32 and a balun 33 are provided between the antenna 20 and a communication circuit 31. With such an antenna device, Bluetooth (registered trademark) communication, for example, can be performed.

Fourteenth Embodiment

Figure 19:
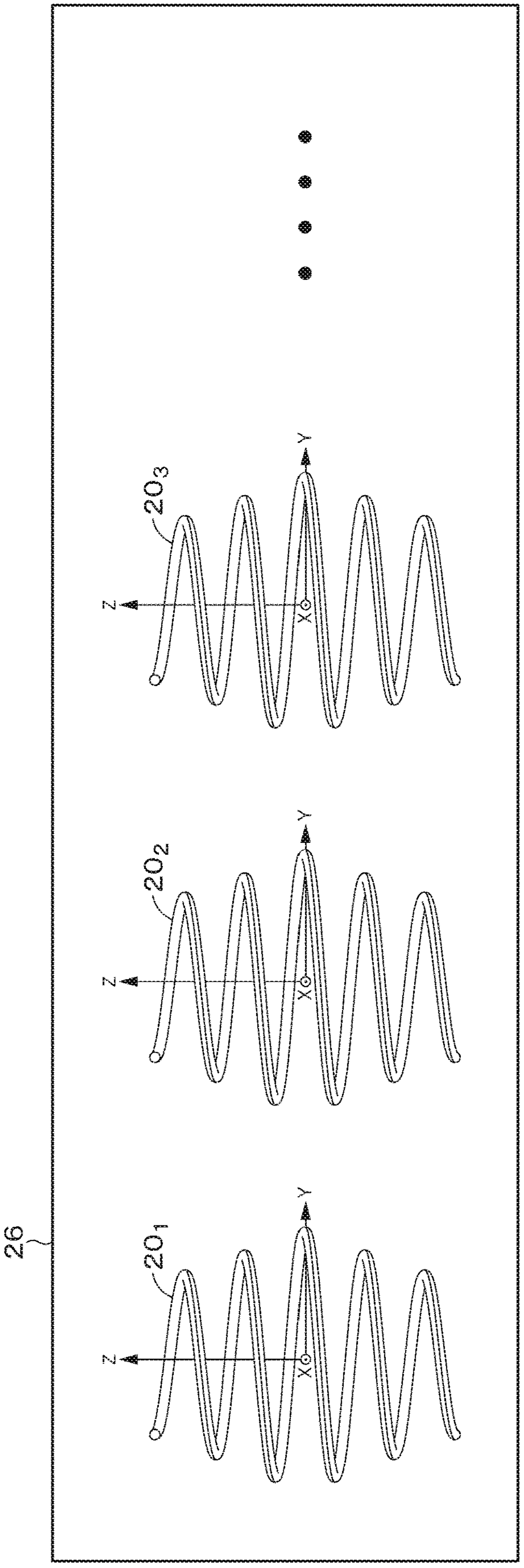
FIG. 19 is a diagram illustrating a fourteenth embodiment of the present technology.
Figure 20:
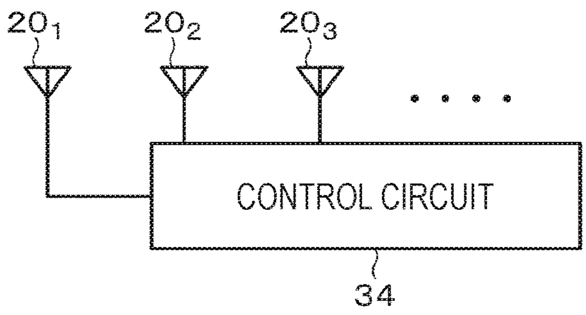
FIG. 20 is a block diagram illustrating a circuit configuration of the fourteenth embodiment of the present technology.

FIG. 19 is a diagram illustrating an antenna device including a normal mode helical antenna according to the fourteenth embodiment of the present technology. The antenna device includes a plurality of normal mode helical antennas 201, 202, and 203 provided on a substrate 26. FIG. 20 is a diagram illustrating a configuration in which the normal mode helical antennas 201, 202, and 203 are connected to a control circuit 34. By including such a plurality of antennas, for example, communication of a multiple input multiple output (MIMO) system, diversity control, and the like can be performed.

Application Example

Figure 21:
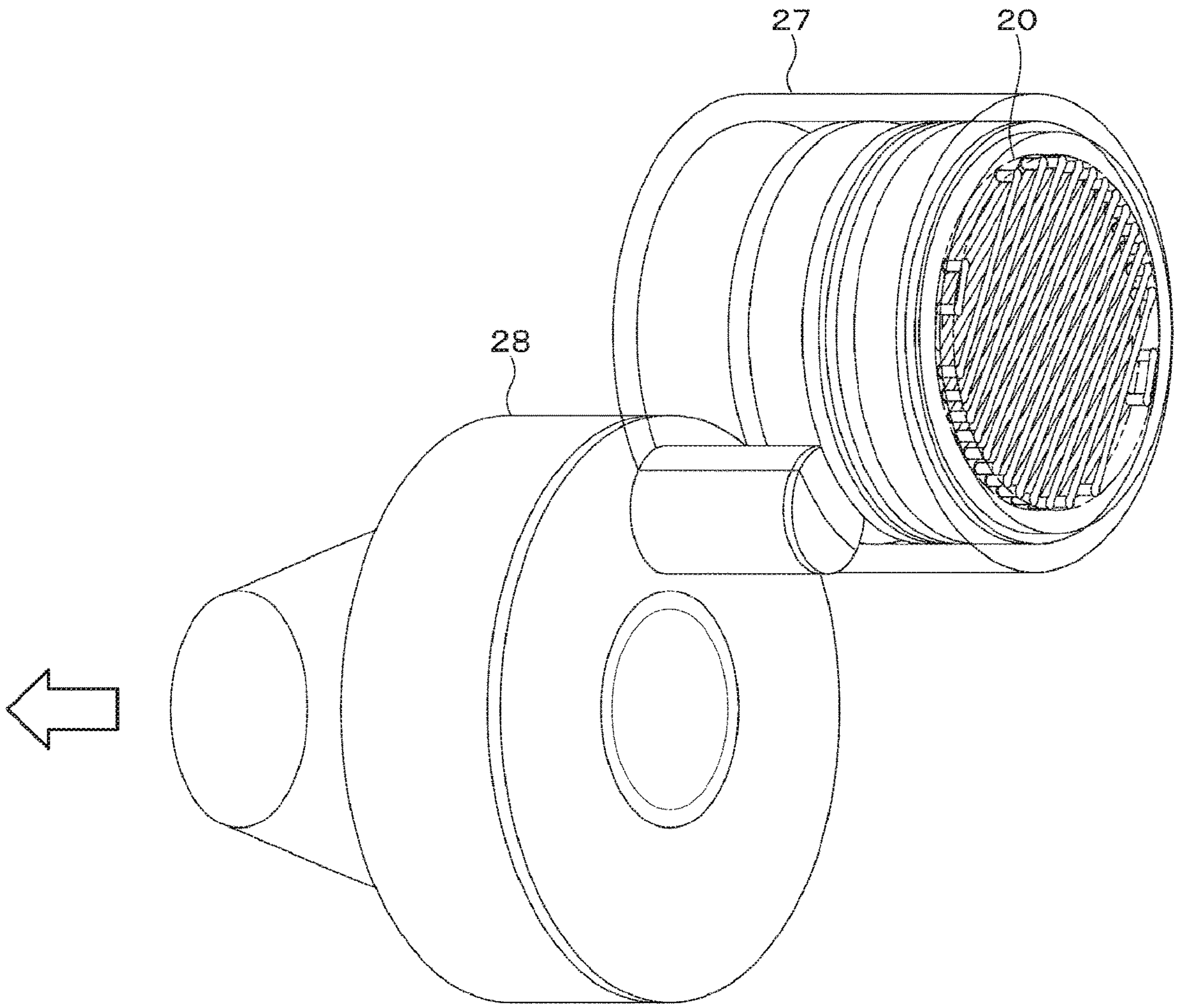
FIG. 21 is a perspective view illustrating an example of an earphone as an application example of the present technology.

FIG. 21 is an explanatory diagram of an application example in which the present technology is applied to a true wireless earphone. For example, the normal mode helical antenna 20, a substrate, a battery, and the like are housed in a case 27 (indicated by a two-dot chain line) of a cylindrical shape. A sound generating portion is housed in a case 28 connected to the case 27 and configured to output a sound in a direction indicated by an arrow (ear direction).

Figure 22A:
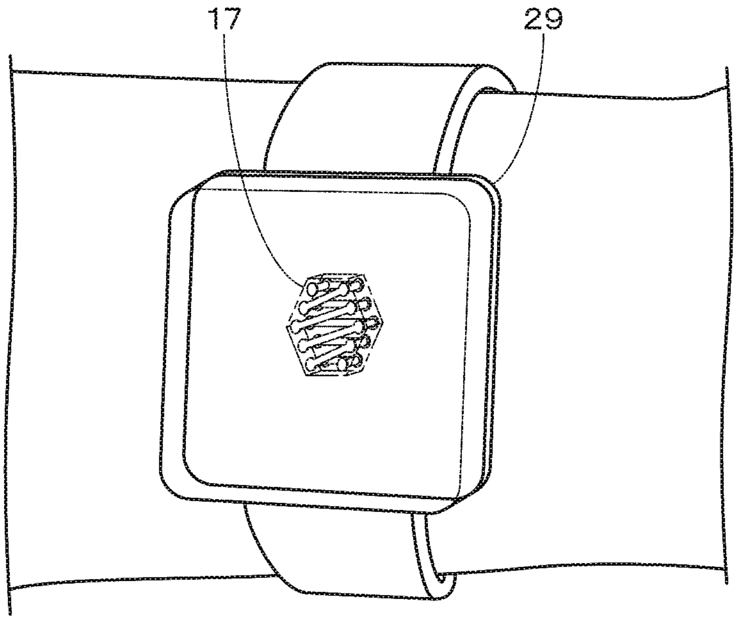
FIGS. 22A and 22B are a perspective view and an enlarged perspective view of a worn state of a wearable device as an application example of the present technology.
Figure 22B:
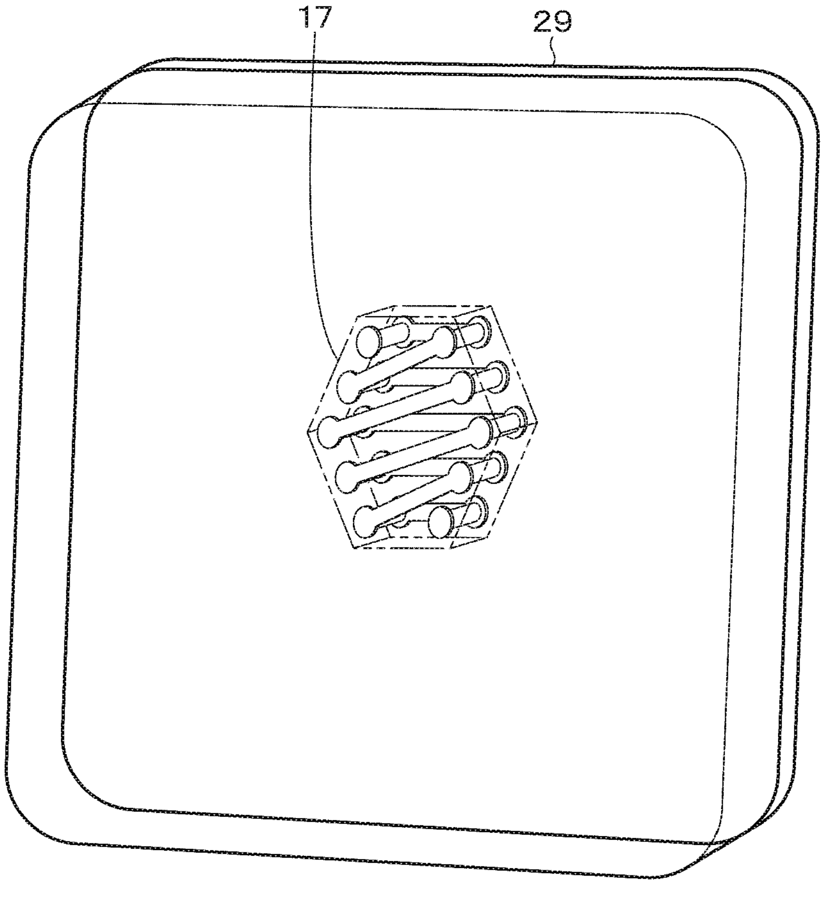

FIGS. 22A and 22B are diagrams illustrating antenna arrangement in a wearable device (wristband type electronic device) as another application example. For example, the wearable device is a wearable device including the antenna 17 described with reference to FIG. 14 and a metal plate 29 as a ground. FIG. 22A illustrates a case where the wearable device is worn on an arm, for example.

A wristband-type activity tracker as an example of the wearable device is also called a smart band, and can acquire and display data related to human activities such as the number of steps, a moving distance, calorie consumption, an amount of sleep, and a heart rate only by being wound around an arm. Moreover, the acquired data can be managed by a smartphone. Moreover, a mail transmission/reception function can be included. The antenna 17 is used for these communication functions.

Note that the present technology can be applied not only to wireless earphones and wearable devices but also to another electronic devices. For example, the present technology can be applied to a wireless controller of a game machine, an IoT device, an audio-visual device such as a digital camera, a radio, a speaker, and a recorder, a head-mounted display, smart glasses, a smartphone, and the like.

Therefore, by increasing a coil diameter (coil sectional area) near the coil center compared to a coil diameter (coil sectional area) at each end, the magnetic current intensity is increased, and it makes it possible to use the above-described present technology in an environment near a metal part in an electronic device or a human body. Furthermore, since the contribution from near the coil end to the magnetic current is small, by reducing the coil diameter near the coil end, an occupied area in the electronic device can be reduced.

Although the embodiments of the present technology have been specifically described above, the present technology is not limited to each of the above-described embodiments, and various modifications based on the technical idea of the present technology can be made.

In the above-described embodiments, in a case where there is a plurality of coils, the diameters of some coils may be smaller or larger than the diameter of another coil. For example, in a normal mode helical antenna having a plurality of coils, at least one coil in coils without feeding points may be thicker than a coil with a feeding point.

Furthermore, one or a plurality of arbitrarily selected aspects of the modifications can be appropriately combined. Furthermore, the configurations, the methods, the steps, the shapes, the materials, the numerical values, and the like of the above-described embodiments can be combined with each other without departing from the gist of the present technology.

Note that the present technology can also have the following configurations.

(1)

An antenna, including a coil constituting a normal mode helical antenna, an area of a cross section perpendicular to an axis of the coil for a single turn at each end of the coil being less than an area of a cross section perpendicular to the axis of the coil near a center of the coil.

(2)

The antenna according to (1), including a feeding point near the coil center.

(3)

The antenna according to (1) or (2), in which the area of the cross section perpendicular to the axis of the coil monotonously decreases from near the coil center toward both ends.

(4)

The antenna according to any one of (1) to (3), in which a pitch of the coil is not constant.

(5)

The antenna according to any one of (1) to (4), in which a shape projected on a cross section perpendicular to the axis of the coil is a convex shape.

(6)

The antenna according to (1), including two or more coils, and having an impedance matching mechanism in which both ends of one coil are short-circuited to both ends of another coil.

(7)

The antenna according to (6), in which at least one of coils without feeding points is thicker than a coil to which the feeding point is connected.

(8)

The antenna according to (1), including an impedance matching mechanism provided with a coil and a feeding tap both ends of which are short-circuited.

(9)

The antenna according to (1), including two or more coils having substantially equal shapes, in which the coils are arranged in plane symmetry, the antenna being configured such that both ends of the coils are short-circuited.

(10)

The antenna according to (1), including patterns on both surfaces of a dielectric material and through holes penetrating the dielectric material, in which the coil is formed by connecting the patterns on both surfaces via the through holes.

(11)

The antenna according to (1), in which the coil is formed by a pattern on a surface of a dielectric material.

(12)

The antenna according to (1), in which a shape of the coil is formed by a good conductor disposed around a magnetic material.

(13)

The antenna according to (1), further including a good conductor at a position substantially parallel to the axis of the coil.

(14)

An electronic device, including an antenna including a coil constituting a normal mode helical antenna, an area of a cross section perpendicular to an axis of the coil for a single turn at each end of the coil being less than an area of a cross section perpendicular to the axis of the coil near a center of the coil, in which the axis of the coil is substantially parallel to a metal part in the device and/or a human body when wearing the antenna.

REFERENCE SIGNS LIST

6, 6A, 6B, 6C, 6D, 17, 20 normal mode helical antenna
7, 8, 9, 10, 11, 12, 13 coil
23 metal plate
24 substrate

The invention claimed is:

1. An antenna, comprising:

a first coil constituting a normal mode helical antenna, wherein a first cross-sectional area of the first coil is less than a second cross-sectional area of the first coil, for a single turn of the first coil, the first cross-sectional area is perpendicular to an axis of the first coil at each end of the first coil, and the second cross-sectional area is perpendicular to the axis of the first coil near a center of the first coil; and a first impedance matching mechanism attached with the first coil, wherein the first impedance matching mechanism includes a feeding tap, and both ends of the feeding tap are short-circuited to the first coil.

2. The antenna according to claim 1, further includes a feeding point near the center of the first coil.

3. The antenna according to claim 2, further comprising:

at least two coils including the first coil, and a second impedance matching mechanism in which both ends of the first coil are short-circuited to both ends of a second coil of the at least two coils.

4. The antenna according to claim 3, wherein the second coil without the feeding point is thicker than the first coil to which the feeding point is connected.

5. The antenna according to claim 1, wherein the second cross-sectional area monotonously decreases from near the center of the first coil toward both opposite ends of the first coil.

6. The antenna according to claim 1, wherein a pitch of the first coil is variable.

7. The antenna according to claim 1, wherein a shape projected on a cross section of the first cross-sectional area and the second cross-sectional area of the first coil is a convex shape.

8. The antenna according to claim 1, further comprising at least two coils including the first coil, wherein the at least two coils have substantially equal shapes, the at least two coils are in a plane symmetry, and the antenna is configured such that both ends of each of the at least two coils are short-circuited.

9. The antenna according to claim 1, comprising:

a plurality of patterns on both surfaces of a dielectric material, and a plurality of through holes which penetrates the dielectric material, wherein the first coil is structured by a connection of the plurality of patterns on the both surfaces of the dielectric material via the plurality of through holes.

10. The antenna according to claim 1, wherein the first coil is structured by a pattern on a surface of a dielectric material.

11. The antenna according to claim 1, wherein the first coil includes a magnetic material, and a shape of the first coil is based on a good conductor which is around the magnetic material.

12. The antenna according to claim 1, further comprising a good conductor at a position substantially parallel to the axis of the first coil.

13. An electronic device, comprising:

an antenna which includes:

a coil constituting a normal mode helical antenna, wherein a first cross-sectional area of the coil is less than a second cross-sectional area of the coil, for a single turn of the coil, the first cross-sectional area is perpendicular to an axis of the coil at each end of the coil, the second cross-sectional area is perpendicular to the axis of the coil near a center of the coil, the axis of the coil is substantially parallel to at least one of a metal part in the electronic device or a human body, and the antenna is worn by the human body; and a first impedance matching mechanism attached with the coil, wherein the first impedance matching mechanism includes a feeding tap, and both ends of the feeding tap are short-circuited to the coil.

* * * * *